(12) United States Patent
McLean et al.

(10) Patent No.: US 8,294,431 B2
(45) Date of Patent: Oct. 23, 2012

(54) METHOD OF CONTROLLING A VARIABLE SPEED CONSTANT FREQUENCY GENERATOR

(75) Inventors: Graham W. McLean, Lymm (GB); David Pollock, Milwaukee, WI (US); Francis X. Wedel, Lake Mills, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 354 days.

(21) Appl. No.: 12/501,798

(22) Filed: Jul. 13, 2009

(65) Prior Publication Data

US 2011/0006547 A1    Jan. 13, 2011

(51) Int. Cl.
*H02P 9/00*    (2006.01)
(52) U.S. Cl. .......................... 322/32; 290/1 A
(58) Field of Classification Search ................. 290/40 A
See application file for complete search history.

(56) References Cited

U.S. PATENT DOCUMENTS

| | | | |
|---|---|---|---|
| 1,953,790 A * | 4/1934 | Warren | 290/40 R |
| 1,963,727 A * | 6/1934 | Warren | 322/36 |
| 2,725,490 A * | 11/1955 | Pestarini | 307/80 |
| 3,412,258 A * | 11/1968 | Satter | 290/40 R |
| 4,246,531 A * | 1/1981 | Jordan | 322/28 |
| 4,413,223 A * | 11/1983 | Yundt et al. | 322/32 |
| 4,994,684 A * | 2/1991 | Lauw et al. | 290/52 |
| 5,083,077 A | 1/1992 | Wallace et al. | |
| 6,169,334 B1 * | 1/2001 | Edelman | 290/52 |
| 6,175,217 B1 | 1/2001 | Da Ponte et al. | |
| 6,278,211 B1 | 8/2001 | Sweo | |
| 6,333,622 B1 * | 12/2001 | Fogarty et al. | 322/90 |
| 6,380,639 B1 * | 4/2002 | Soucy | 290/40 B |
| 6,392,371 B1 * | 5/2002 | Cheng et al. | 318/158 |
| 6,784,634 B2 | 8/2004 | Sweo | |
| 6,844,706 B2 * | 1/2005 | Pinkerton et al. | 322/29 |
| 7,239,034 B2 * | 7/2007 | Gehret, Jr. | 290/40 B |
| 7,675,187 B2 * | 3/2010 | Woods et al. | 290/1 A |
| 2008/0218118 A1 | 9/2008 | Vaez-Zadeh et al. | |
| 2011/0251773 A1 * | 10/2011 | Sahandiesfanjani et al. | 701/102 |

FOREIGN PATENT DOCUMENTS

| | | |
|---|---|---|
| CN | 101013874 | 12/2006 |
| CN | 201039068 | 3/2008 |
| JP | 63265599 A * | 11/1988 |
| JP | 05-284798 | 10/1993 |
| JP | 2000-184798 | 12/1998 |
| JP | 2005-245105 | 9/2005 |
| JP | 2008-038868 | 2/2008 |

\* cited by examiner

*Primary Examiner* — Joseph Waks
(74) *Attorney, Agent, or Firm* — Boyle Fredrickson, S.C.

(57) ABSTRACT

A method of controlling an engine-driven, electrical generator is provided. The generator generates an output voltage at a frequency with the engine running at an operating speed. The method includes the steps of connecting the generator to a load and varying the operating speed of the engine to optimize fuel consumption in response to the load. Thereafter, the frequency of the output voltage is modified to a predetermined level.

16 Claims, 1 Drawing Sheet

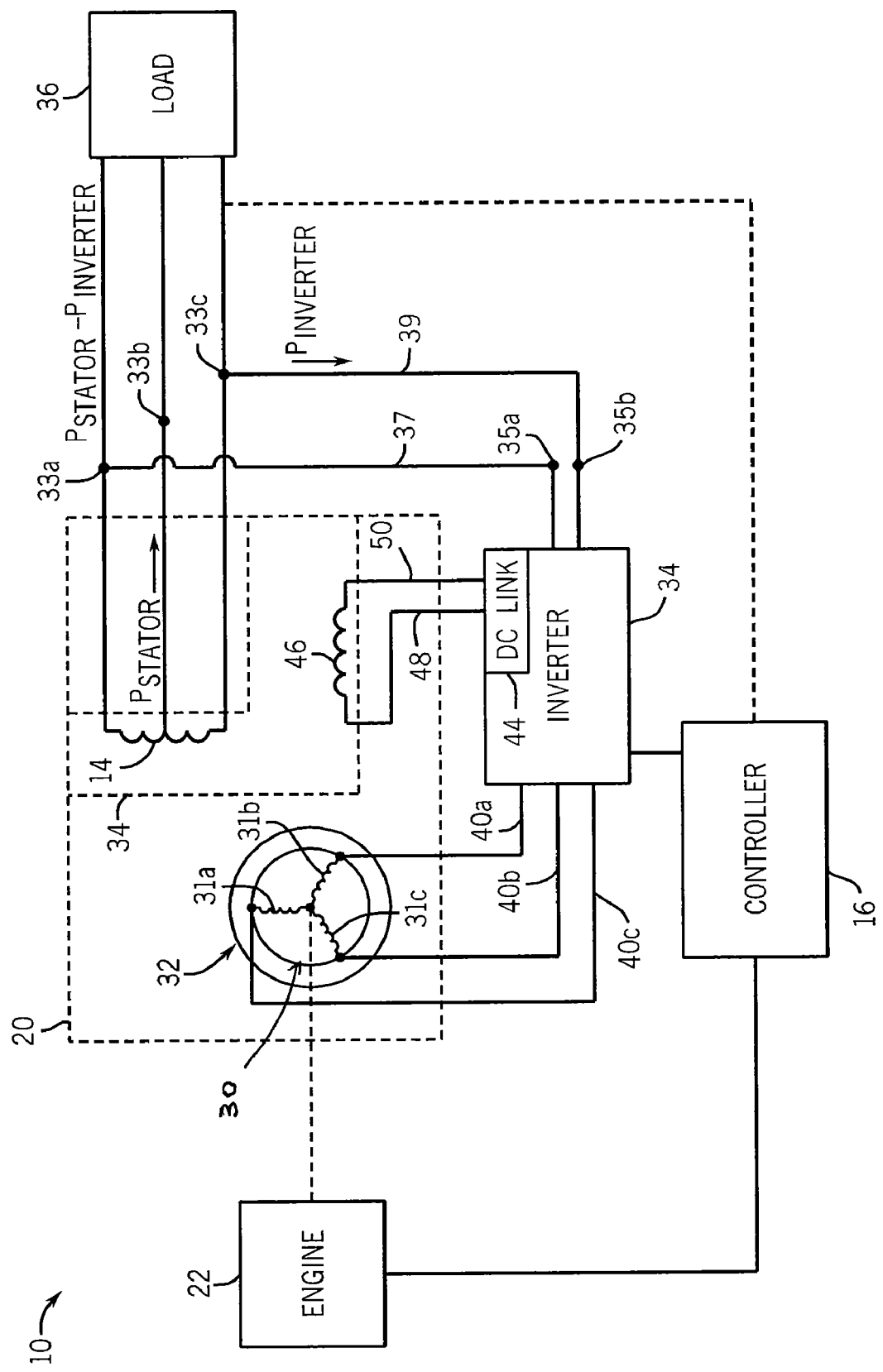

METHOD OF CONTROLLING A VARIABLE SPEED CONSTANT FREQUENCY GENERATOR

FIELD OF THE INVENTION

This invention relates generally to engine-driven, electrical generators, and in particular, to a method for controlling a variable speed, constant frequency, stand-by electrical generator.

BACKGROUND AND SUMMARY OF THE INVENTION

Electrical generators are used in a wide variety of applications. Typically, an individual electrical generator operates in a stand-by mode wherein the electrical power provided by a utility is monitored such that if the commercial electrical power from the utility fails, the engine of the electrical generator is automatically started causing the alternator to generate electrical power. When the electrical power generated by the alternator reaches a predetermined voltage and frequency desired by the customer, a transfer switch transfers the load imposed by the customer from the commercial power lines to the electrical generator.

Typically, electrical generators utilize a single driving engine coupled to a generator or alternator through a common shaft. Upon actuation of the engine, the crankshaft rotates the common shaft so as to drive the alternator that, in turn, generates electrical power. As is known, most residential electric equipment in the United States is designed to be used in connection with electrical power having a fixed frequency, namely, sixty (60) hertz (Hz). The frequency of the output power of most prior electrical generators depends on a fixed, operating speed of the engine. Typically, the predetermined operating speed of an engine for a two-pole, stand-by electrical generator is approximately 3600 revolutions per minute to produce the rated frequency and power for which the unit is designed. However, in situations when the applied load is the less than the rated kilowatt load for which the unit is designed, the fuel-efficiency of the engine will be less than optimum. As such, it can be appreciated that it is highly desirable to vary the operating speed of the engine of an electrical generator to maximize fuel efficiency, and thus reduce $CO_2$ emissions, of the engine for a given load. Further, operation of the engine-driven, electrical generator at its predetermined operating speed can produce unwanted noise. It can be appreciated that reducing the operating speed of the engine of an electrical generator to correspond to a given load will reduce the noise associated with operation of the engine-driven, electrical generator.

Therefore, it is a primary object and feature of the present invention to provide a method for controlling a variable speed, constant frequency, stand-by electrical generator.

It is a further object and feature of the present invention to provide a method for controlling a variable speed, constant frequency, stand-by electrical generator that maximize fuel efficiency of the engine for a given load.

It is a still further object and feature of the present invention to provide a method for controlling a variable speed, constant frequency, stand-by electrical generator that is simple and that reduces the overall cost of operation of the generator.

It is a still further object and feature of the present invention to provide a method for controlling a variable speed, constant frequency, stand-by electrical generator that minimizes the noise associated with operation of the generator.

In accordance with the present invention, a method of controlling an engine-driven, electrical generator is provided. The generator generates an output voltage at a frequency with the engine running at an operating speed. The method includes the steps of connecting the generator to a load and varying the operating speed of the engine to optimize fuel consumption in response to the load. Thereafter, the frequency of the output voltage is modified to a predetermined level.

The step of modifying the frequency of the output voltage includes the additional steps of calculating the difference between the frequency of the output voltage and the predetermined level and providing the difference as an adjustment frequency. The frequency of the output voltage is modified by the adjustment frequency. The generator includes a rotor having windings and stator having an output. The output of the stator is connectable to the load. In addition, the output of the stator is operatively connected to an input of an inverter. The inverter receives the output voltage at the frequency. The output of the inverter is operatively connected to the windings of the rotor. The inverter supplies power to the rotor windings at the adjustment frequency. The stator has a main winding and a quadrature winding, and the inverter includes a DC link. The sensing input of the inverter is operatively connected to the main winding and power for the DC link is operatively connected to the quadrature winding. It is contemplated for the predetermined level of the unmodified frequency to be in the range of 40 to 75 hertz and for the engine to have a minimum operating speed of approximately 2400 revolutions per minute.

In accordance with a further aspect of the present invention, a method of controlling an engine-driven, electrical generator including a rotor and a stator having an output is provided. The generator generates an output voltage at a frequency at the stator output with the engine running at an engine speed. The method includes the steps of connecting the output of the stator to a load and adjusting the engine speed in response to the load. The difference between the frequency of the output voltage and a predetermined level is calculated and the difference is provided as an adjustment frequency. The frequency of the output voltage is modified by the adjustment frequency.

The generator includes a rotor having windings and the method includes the additional step of operatively connecting the output of the stator to an input of an inverter. The inverter receives the output voltage at the frequency. An output of the inverter is operatively connected to the windings of the rotor. The inverter supplies power to the rotor windings at the adjustment frequency.

The stator has a main winding and a quadrature winding, and the inverter includes a DC link. The input of the inverter is operatively connected to the main winding and the DC link is operatively connected to the quadrature winding. It is contemplated for the predetermined level of the frequency is in the range of 40 to 75 hertz and for the engine to have a minimum operating speed of approximately 2400 revolutions per minute.

In accordance with a still further aspect of the present invention, a method of controlling an engine-driven, electrical generator including a rotor having rotor windings and stator having an output is provided. The generator generates an output voltage at a frequency at the stator output with the engine running at an engine speed. The method includes the steps of connecting the output of the stator to a load and adjusting the engine speed in response to the load. Slip power is supplied to the rotor windings to adjust the frequency of the output voltage to a predetermined level.

The step of supplying slip power to the rotor windings includes the additional steps of calculating the difference between the frequency of the output voltage and the predetermined level and providing the difference as an adjustment frequency. The slip power has a frequency generally equal to the adjustment frequency. The output of the stator is operatively connected to an input of an inverter. The inverter receives the output voltage at the frequency. An output of the inverter is operatively connected to the windings of the rotor. The inverter supplies the slip power to the rotor windings at the adjustment frequency.

The stator has a main winding and a quadrature winding, and the inverter includes a DC link. The input of the inverter is operatively connected to the main winding and the DC link is operatively connected to the quadrature winding. It is contemplated for the predetermined level of the frequency is in the range of 40 to 75 hertz and for the engine to have a minimum operating speed of approximately 2400 revolutions per minute. The engine speed is adjusted to optimize fuel consumption in response to the load thereon.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a schematic view of an engine-driven, electrical generator system for performing the method of the present invention.

DETAILED DESCRIPTION OF THE DRAWINGS

Referring to FIG. 1, an engine-driven, electrical generator system for performing the methodology of the present invention is generally generated by the reference numeral 10. Generator system 10 includes generator 20 defined by cylindrical rotor 30 rotatably received within stator 32. By way of example, rotor 30 includes three-phase windings 31a-31c supplied by inverter 34, as hereinafter described. Stator 32 includes a plurality of electrical windings (e.g. main winding 14) wound in coils over an iron core and an excitation or quadrature winding 46 shifted 90 degrees from main winding 14. Rotation of rotor 30 generates a moving magnetic field around stator 32 which, in turn, induces a voltage difference between the windings of stator 32. As a result, alternating current (AC) power is provided across outputs 33a-33c of stator 32. Outputs 33a-33c of stator 32 are connectable to load 36 for supplying AC power thereto.

Generator system 10 further includes engine 22. As is conventional, engine 22 receives fuel such as natural gas or liquid propane vapor through an intake. The fuel provided to engine 22 is compressed and ignited within the cylinders thereof so as to generate reciprocating motion of the pistons of engine 22. The reciprocating motion of the pistons of engine 22 is converted to rotary motion by a crankshaft. The crankshaft is operatively coupled to rotor 30 of generator 20 through a shaft such that as the crankshaft is rotated by operation of engine 22, the shaft drives rotor 30 of generator 20.

As is known, the frequency of the AC power at outputs 33a-33c of stator 32 is dependent upon the number of poles and the rotational speed of rotor 30 which corresponds, in turn, to the speed of engine 22. The engine speed corresponding to a particular frequency is called the synchronous speed ($N_s$) for that frequency. By way of example, the synchronous speed for a two pole rotor producing AC power at 60 hertz at outputs 33a-33c of stator 32 is 3600 revolutions per minute.

It is noted that engine 22 of generator system 10 does not operate at a fixed, constant speed, but rather, operates at a speed that varies in accordance with the load magnitude. In other words, at low loads, where relatively little current is required by load 36 from generator 20, the engine speed is relatively low. At higher loads, where greater current is drawn from generator 20, the engine speed is higher. While it can be appreciated that the speed of engine 22 can be readily adjusted to optimize the fuel consumption and reduce the noise level associated with operation of engine 22, these changes in the engine speed, in turn, cause the frequency and voltage at the output of generator 20 to change. However, in all cases, the frequency and voltage of the AC power produced at outputs 33a-33c of stator 32 must remain relatively constant and substantially within pre-established upper and lower limits (e.g., 56-60 Hz, and 108-127 $V_{rms}$). As such, voltage and frequency regulation, as hereinafter described, is provided.

Generator system 10 further includes controller 16 operatively connected to a current transformer (not shown) and to the throttle actuator of engine 22. The current transformer measures the magnitude of load 36 and supplies the same to controller 16. It is intended for controller 16 to calculate the optimum fuel consumption for engine 22 for a given load 36. It can be appreciated that minimum fuel consumption typically occurs at approximately ⅔ of the synchronous speed ($N_s$) of engine 22. As such, for a two pole rotor producing AC power at 60 hertz at outputs 33a-33c of stator 32, the minimum fuel consumption occurs at an engine speed of 2400 revolutions per minute. In response to instructions received from controller 16, the throttle actuator coupled to engine 22 increases or decreases the speed of engine 22 to optimize the fuel consumption of engine.

It is also contemplated for controller 16 to receive various additional inputs indicative of the engine operating conditions and provides additional control commands (e.g., an engine shutdown command in the event oil pressure is lost) to the engine 22.

Inputs 35a and 35b of inverter 34 are operatively connected to the stator windings through outputs 33a and 33c, respectively, of stator 32 via lines 37 and 39. In addition, DC link 44 of inverter 34 is operatively connected to quadrature winding 46 of stator 32 via lines 48 and 50. In a single phase application, the input input from quadrature winding 46 to DC link 44 is rectified to provide DC link 44 with current. In addition, the AC power supplied to DC link 44 from stator 32 is converted by a three phase bridge to three phase AC power with a controllable frequency across lines 40a-40c. Lines 40a-40c are operatively connected to rotor windings 31a-31c, respectively, of rotor 30 via, e.g. slip rings, to supply three phase currents thereto. As hereinafter described, it is intended for the three phase currents to produce a traveling wave of magnetic flux relative to rotor 30 so the speed of rotor 30 relative to stator 32 is maintained at the synchronous speed ($N_s$) of engine 22.

Given the rotor speed ($N_r$), the traveling wave of magnetic flux produced by the three phase currents supplied by inverter 34 relative to rotor 30 is equal to the difference between the synchronous speed ($N_s$) and the rotor speed ($N_r$). As such, stator 32 "sees" the magnetic flux wave travelling at the synchronous speed ($N_s$) independent of the rotor speed ($N_r$) and will produce a constant frequency at outputs 33a-33c thereof. For a rotor 30 having two poles, the required frequency for the AC power supplied by inverter 34 to rotor windings 31a-31c to produce a traveling wave of magnetic flux that causes the outputs of stator 32 to have a constant frequency may be calculated according to the equation:

$$f_{inverter} = \frac{N_s - N_r}{60} \qquad \text{Equation (1)}$$

wherein: $f_{inverter}$ is the frequency of the AC power supplied by inverter 34 to rotor windings 31a-31c; $N_s$ is the synchronous speed; and $N_r$ is the rotor speed.

In order to deliver constant voltage and current at outputs 33a-33c of stator 32, the AC power supplied by inverter 34 may be calculated according to the equation:

$$P_{inverter} = P_{stator} \times \frac{N_s - N_r}{N_r} \qquad \text{Equation (2)}$$

wherein: $P_{inverter}$ is the AC power supplied by inverter 34 or slip power; $P_{stator}$ is the AC power at outputs 33a-33c and quadrature winding 46 of stator 32; $N_s$ is the synchronous speed; and $N_r$ is the rotor speed.

In view of the foregoing, it can be appreciated that by controlling the magnitude and the frequency of the AC power supplied to rotor windings 31a-31c by inverter 34, the frequency and voltage of the AC power produced by generator 10 at outputs 33a-33c of stator 32 remains relatively constant and substantially within pre-established upper and lower limits. In operation, engine 22 is started such that generator 20 generates electrical power at outputs 33a-33c of stator 32, as heretofore described. Controller 16 monitors the magnitude of load 36 and calculates the optimum fuel consumption for engine 22. In response to instructions received from controller 16, the throttle actuator coupled to engine 22 increases or decreases the engine speed (up to a maximum of 3600 revolutions for a two pole) to optimize the fuel consumption of engine. Independent of load 36, controller 16 maintains the speed of engine 22 at minimum 2400 revolutions per minute since the minimum fuel consumption of engine 22 occurs at an engine speed of 2400 revolutions per minute.

In order to maintain the frequency and voltage of the AC power produced by generator 10 at outputs 33a-33c of stator 32, controller 16 determines the frequency and magnitude of the slip power to be supplied to rotor windings 31a-31c by inverter 34. Thereafter, under the control of controller 16, inverter 34 converts the AC power supplied at the inputs thereof to the slip power having the desired magnitude and desired frequency.

When rotor 30 is rotating at synchronous speed ($N_S$), inverter 34 must provide a stationary wave relative to rotor 30 in order to produce the same magnetomotive force as produced by a normal constant speed alternator. In this manner, inverter 34 behaves as a automatic voltage regulator behaves in a conventional alternator which has to provide a magnetizing magnetomotive force, as well as, a component to oppose the armature reaction. Further, it can be appreciated that in single phase applications, utilizing quadrature winding 46 of stator 32 to power DC link 44 of inverter 34, the main windings of stator 32 is kept free of harmonics which occur as a natural result of DC link 44. This, in turn, eliminates the need for additional filtering or for power factor correction upstream of DC link 44.

Various modes of carrying out the invention are contemplated as being within the scope of the following claims particularly pointing out and distinctly claiming the subject matter that is regarded as the invention.

We claim:

1. A method of controlling an engine-driven, electrical generator, the generator generating an output voltage at a frequency with the engine running at an operating speed, the method comprising the steps of:
   connecting the generator to a load;
   varying the operating speed of the engine to optimize fuel consumption in response to the load thereon;
   calculating the difference between the frequency of the output voltage of the generator supplied to the load at the operating speed of the engine and a desired frequency of the output voltage and providing the difference as an adjustment frequency; and
   modifying the frequency of the output voltage by the adjustment frequency independent of the engine speed.

2. The method of claim 1 wherein the generator includes a rotor having windings and stator having an output, the output of the stator being connectable to the load.

3. The method of claim 2 comprising the additional steps of:
   operatively connecting the output of the stator to an input of an inverter, the inverter receiving the output voltage at the frequency; and
   operatively connecting an output of the inverter to the windings of the rotor, the inverter supplying power to the rotor windings at an adjustment frequency.

4. The method of claim 3 wherein the stator has a main winding and a quadrature winding and wherein the inverter includes a DC link, the input of the inverter being operatively connected to the main winding and the DC link being operatively connected to the quadrature winding.

5. The method of claim 1 wherein the desired frequency of the output voltage is in the range of 40 to 75 hertz.

6. The method of claim 1 wherein the engine has a minimum operating speed of approximately 2400 revolutions per minute.

7. A method of controlling an engine-driven, electrical generator including a rotor and stator having an output, the generator generating an output voltage at a frequency at the stator output with the engine running at an engine speed, comprising the steps of:
   connecting the output of the stator to a load;
   adjusting the engine speed to optimize fuel consumption in response to the load;
   calculating the difference between the frequency of the output voltage of the generator supplied to the load at the operating speed of the engine and a desired frequency of the output voltage and providing the difference as an adjustment frequency; and
   modifying the frequency of the output voltage by the adjustment frequency without further adjustment of the engine speed.

8. The method of claim 7 wherein the generator includes including a rotor having windings and wherein the method includes the additional steps of:
   operatively connecting the output of the stator to an input of an inverter, the inverter receiving the output voltage at the frequency; and
   operatively connecting an output of the inverter to the windings of the rotor, the inverter supplying power to the rotor windings at the adjustment frequency.

9. The method of claim 8 wherein the stator has a main winding and a quadrature winding and wherein the inverter includes a DC link, the input of the inverter being operatively connected to the main winding and the DC link being operatively connected to the quadrature winding.

10. The method of claim 8 wherein the desired frequency of the output voltage is in the range of 40 to 75 hertz.

11. The method of claim 8 wherein the engine has a minimum operating speed of approximately 2400 revolutions per minute.

12. A method of controlling an engine-driven, electrical generator including a rotor having rotor windings and stator having an output, the generator generating an output voltage at a frequency at the stator output with the engine running at an engine speed, comprising the steps of:
   connecting the output of the stator to a load;
   adjusting the engine speed to optimize fuel consumption in response to the load;
   supplying slip power to the rotor windings to adjust the frequency of the output voltage to a predetermined level without further adjustment of the engine speed;
   wherein the step of supplying the slip power to the rotor windings includes the additional steps of:
      calculating the difference between the frequency of the output voltage supplied to the load and the predetermined level and providing the difference as an adjustment frequency; and
      generating the slip power having a frequency generally equal to the adjustment frequency.

13. The method of claim 12 comprising the additional steps of:
   operatively connecting the output of the stator to an input of an inverter, the inverter receiving the output voltage at the frequency; and
   operatively connecting an output of the inverter to the windings of the rotor, the inverter supplying the slip power to the rotor windings at the adjustment frequency.

14. The method of claim 13 wherein the stator has a main winding and a quadrature winding and wherein the inverter includes a DC link, the input of the inverter being operatively connected to the main winding and the DC link being operatively connected to the quadrature winding.

15. The method of claim 12 wherein the predetermined level of the frequency is in the range of 40 to 75 hertz.

16. The method of claim 12 wherein the engine has a minimum operating speed of approximately 2400 revolutions per minute.

* * * * *